365-127 SR

OR 3,858,186

BEST AVAILABLE COPY

United Stat

Barker

[11] 3,858,186

[45] Dec. 31, 1974

[54] METHOD AND APPARATUS FOR QUALIFYING IDENTIFICATION MEANS USING LASER GENERATED INFORMATION STORAGE AND RETRIEVAL APPARATUS

[76] Inventor: Ronald C. Barker, c/o Applied Laser Technology, Inc., 40 Westland Rd., Weston, Mass. 02193

[22] Filed: Aug. 31, 1973

[21] Appl. No.: 393,354

Related U.S. Application Data

[63] Continuation-in-part of Ser. No. 149,277, June 2, 1971, abandoned, which is a continuation-in-part of Ser. No. 870,186, July 10, 1969, abandoned.

[52] U.S. Cl. ........................ 340/173 LM, 350/160 R
[51] Int. Cl. ........................ G11c 11/42, G11c 13/04
[58] Field of Search ........... 340/173 LM; 350/160 R

[56] References Cited

UNITED STATES PATENTS 3,636,526 1/1972 Feinleib ....................... 340/173 LM

*Primary Examiner*—Terrell W. Fears
*Attorney, Agent, or Firm*—Seidel, Gonda & Goldhammer

[57] ABSTRACT

In an apparatus and a method for qualifying identification means such as credit cards, qualifying information is stored in a memory comprising a substrate and an occluding film layer. The memory is generally positioned intermediate an optical axis extending from laser apparatus comprising an array of electro-optic semi-conductor lasers. The lase mode of the semiconductors is used to write in the qualifying information; the light emitting mode is used to read out the information. Normally, the film on the substrate occludes the radiation emitted by the laser array. However, the film may be removed by focusing the radiation in the lase mode on the film surface of the memory. The memory and the laser array are moved relative to each other so that the information stored in the memory can be scanned. The substrate of the memory may be transmissive or reflective of the radiation emitted by the lasers in the light emitting mode. An array of transducers is positioned relative to the memory to detect the presence of such radiation after it has been transmitted through, or reflected from, the substrate of the memory. Particular lasers within the laser array are energized to remove portions of the occluding film as an indication of the status of the identification means. To qualify identification means, the laser array is activated in a light emitting mode. The transducer array detects the presence or absence of radiation depending on whether scanned portions of the film have been removed. The output of the transducer array is registered or otherwise indicated to the user of the apparatus.

11 Claims, 4 Drawing Figures

BEST AVAILABLE COPY

INVENTOR
RONALD C. BARKER

BY

Seidel, Gonda & Goldhammer
ATTORNEYS

INVENTOR
RONALD C. BARKER
BY
Seidel, Gonda & Goldhammer
ATTORNEYS

BEST AVAILABLE COPY

METHOD AND APPARATUS FOR QUALIFYING IDENTIFICATION MEANS USING LASER GENERATED INFORMATION STORAGE AND RETRIEVAL APPARATUS

PRIOR APPLICATIONS

This application is a continuation-in-part of application Ser. No. 149,277 filed June 2, 1971 now abandoned for Method and Apparatus for Qualifying Identification Means Using Laser Generated Information Storage and Retrieval Apparatus which in turn is a continuation-in-part of application Ser. No. 870,186 filed July 10, 1969 now abandoned for Method and Apparatus for Qualifying Identifying Means.

This invention relates to an apparatus and a method for qualifying identification means such as credit cards and the like, using lasers to both write qualifying information into a memory and to read out that information. The lase mode of an array of electro-optic semiconductors is used to write in the qualifying information and the light emitting mode is used to read out that information. More particularly, the present invention relates to a method and apparatus whereby identification means can be qualified at remote terminals by persons who must act promptly with respect to such identification means.

There are known methods for determining whether or not the bearer of an identification means, such as a credit card, is an authorized bearer. Such devices have particular relevance to the illegal use of identification means by persons either not named on such identification means or not in privy with the person who is named. An example of such illegal use is the use by a person who has come into possession of a stolen or lost credit card. Inventions disclosed in numerous patent applications are effective in determining whether an identification means is being illegally used.

In patent application Ser. No. 870,186 filed July 10, 1969 for Method and Apparatus for Qualifying Identifying Means, the invention is directed to an apparatus and a method for determining whether or not improper use of an identification means is being made. The term "improper use" as used in that patent application, and as used herein, means use by a person or persons who are properly in possession of the identification means but whose right to use it has been revoked or limited. The invention of patent application Ser. No. 870,186 and the invention of the present application are directed to the qualification of identification means upon presentation by a proper bearer. An example of improper use by such a bearer would be use of the credit card despite the fact that the credit has been revoked or exhausted. The present invention is an improvement upon the invention of patent application Ser. No. 870,186 in that it is directed to a rapid and accurate manner for determining whether or not the identification means is being properly used.

As used herein, "identifying means" may include credit cards, bank passbooks, passports, library cards, identification badges, or any commonly known device by which a bearer identifies himself. Since the most critical problems in the use of identification means are presently those which involve the granting of credit, the term "credit card" may be used herein. But it should be understood that the invention is generally applicable to all identification means.

A current system for determining whether a credit card is being illegally or improperly used is to compare the identifying indicia embossed or otherwise placed thereon with a lengthy list of revoked or stolen credit cards. The list is published on a periodic basis and distributed to persons who issue credit on the basis of the presentation of a credit card. Regardless of how often the list is published, it can never be current. Moreover, the cost of printing and publishing such a list limits the frequency of publication, and hence its accuracy. Another disadvantage of such periodically published lists is that, for the most part, they are unused.

A more refined form of the above described system for qualifying credit cards is to use a central memory connected to remote terminals by conventional electronic means such as telephone or other communication lines. The remote terminals are usually in the form of a keyboard. The operator must communicate with the central memory through the keyboard by entering an entire credit card number. The memory must be searched for the entire card number to ascertain the status of the card. Then, a signal indicative of the result must be generated and transmitted back to the terminal.

The present invention is directed to a method and apparatus for overcoming the inadequacies of the foregoing systems. It is also directed to a method and apparatus for qualifying credit cards and other identification means on a real time basis. It is the purpose of the present invention to provide a memory device which stores information identifying an identification means such as a credit card as well as information concerning the status of such identification means. The invention also includes means to read out information concerning the qualification of a particular identification means.

The present invention takes advantage of current laser technology, that is, the ability to record a large number of bits of information in a single memory. In particular, the present invention uses an array of lasers to form tiny holes in an occluding surface mounted on a substrate. The holes on this surface identify a particular credit card. For example, information serving to identify the credit card can be entered in the memory by forming holes according to a binary coded decimal system.

In addition, means are provided for communicating with a memory remotely located from a central control. The appartus of the present invention includes means by which information emanating from a central control and concerning the status of a particular identification means can be immediately inserted into the memory. Accordingly, a method and an apparatus is provided for furnishing information on the improper use of credit cards on a real time basis.

The invention disclosed in patent application Ser. No. 870,186 relies upon an addressing scheme for each credit card. Thus, each credit card in existence, whether disqualified or not, must be assigned a position in the memory. The status of the credit card for qualification purposes is determined by the presence or absence of a hole in the occluding film at that position. One disadvantage of such a system is that the memory must be of sufficient size to provide for every credit card issued, whether qualified or disqualified. Moreover, credit card companies cannot be mixed within a particular memory device.

The present invention overcomes the disadvantages of the invention described in patent application Ser. No. 870,186 by eliminating the need for an addressing technique. In accordance with the present invention, an array of lasers is provided for writing a number corresponding to disqualified identifying means into the memory. Using this technique, only disqualified identification means need be written into the memory. As a result, a considerable portion of the memory is made available for storing additional information concerning the particular identifying means. Another advantage of using an array of lasers is that it allows flexible methods for detecting the presence of a number in the memory. Thus, the memory need only be searched up to the point where a lack of coincidence is found between the digit entered into the keyboard and the appropriate disqualifying digit in the memory. This reduces the time required for an average search of the memory and also reduces the probability of error in qualifying a particular identification means.

Another advantage of the present invention is that shutters or other intensity modulating devices are unnecessary. This is due to the characteristic of semiconductor lasers of generating high intensity radiation in the lase mode but low intensity radiation in the light emitting mode.

As used herein, the term "light emitting mode" refers to the mode of operation of electro-optic semiconductor lasers which is also known in the art as the "incoherent" mode. In addition, since the semiconductor may be operated continuously in the mode, the mode is also known as "continuous wave" or "CW." The nomenclature notwithstanding, the mode is characterized by relatively broad spectral emission. A spread in wave length of several hundred angstroms is typical. The radiation is entirely phase incoherent. Moreover, the power output is low. For example, a GaAs semi-conductor crystal sixty micrometers wide will supply about $10^{-6}$ to $10^{-4}$ watts when energized by about $10^{-3}$ to $10^{-1}$ amperes of current.

The second mode of operation of the semiconductor, the "lase" mode, is also known in the art as the "coherent" mode. Strictly speaking, however, the radiation is not truly coherent in this mode of operation. Nevertheless, the term is often applied to this mode. In particular, operation in this mode is characterized by a spread in wave length of less than 10 angstroms. This mode can only be achieved by energizing the semi-conductor with a large burst of current. Thus, for a GaAs crystal sixty micrometers wide a power output of 3 watts is achieved by energizing the crystal with 10 to 20 amperes of current.

The foregoing and other advantages of the present invention will become apparent from the following description of the specific embodiment.

For the purpose of illustrating the invention, there is shown in the drawings a form which is presently preferred; it being understood, however, that this invention is not limited to the precise arrangements and instrumentalities shown.

Figure 1:
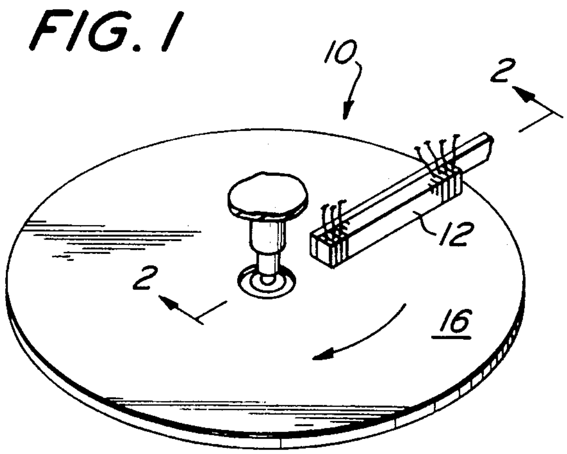
FIG. 1 is a perspective view of the apparatus for performing the present invention.

Referring now to the drawing in detail wherein like numerals indicate like elements, there is shown in FIG. 1 an apparatus for qualifying identifying means, that is, for determining whether the bearer is properly using the identifying means. The invention is described in connection with a credit card, but as previously stated, it is equally applicable to all forms of identification means and has other applications which should be apparent to those skilled in the art.

The apparatus 10 includes an array of lasers 12 which are of the electro-optic semi-conductor type. For example, such lasers may be diode lasers made of gallium arsenide. Solid state lasers are well-known and their construction need not be described in detail for the purpose of this invention. Rather, it is sufficient to state that the present invention contemplates using certain characteristics of such solid state lasers. Specifically, the present invention exploits the ability of such lasers to produce low intensity radiation in the light emitting mode when activated by a low energy electric signal, and the ability of such lasers to produce high intensity radiation in the lase mode when activated by a sufficiently high energy electric signal.

Figure 2:
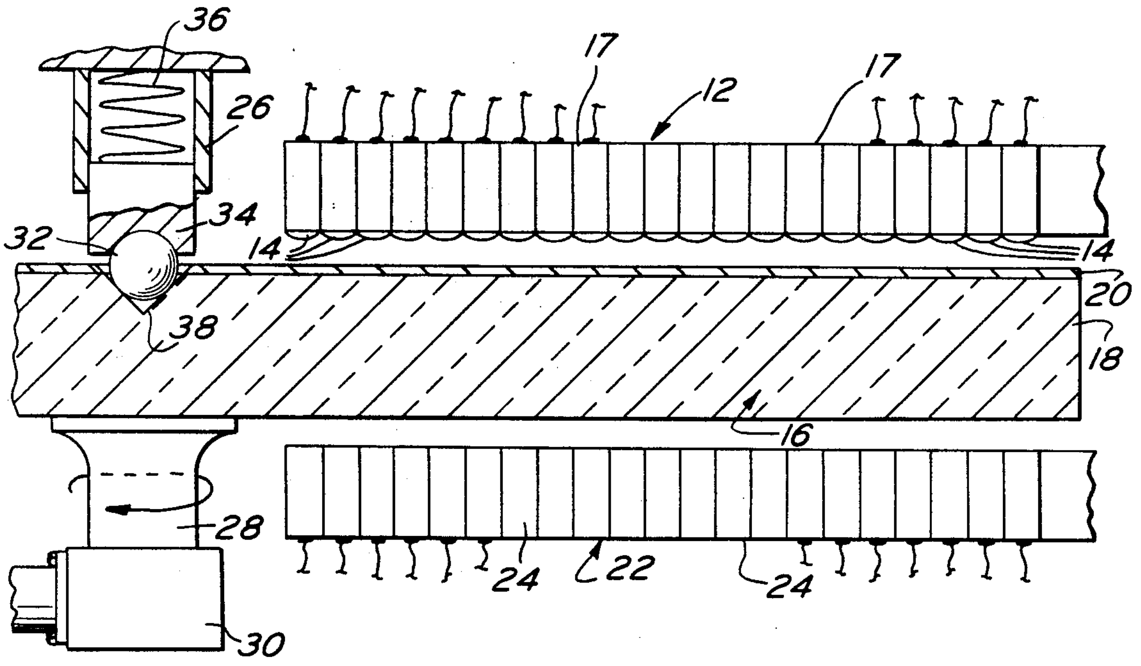
FIG. 2 is a partial sectional view of the apparatus illustrated in FIG. 1 taken along the line 2—2.

Radiation generated by the array of lasers 12 is focused on the surface of the memory 16 by the lenses 14. A lens 14 is associated with each semi-conductor laser. The memory 16, as best illustrated in FIG. 2, comprises a substrate 18 and a thin occluding film 20 coating the surface of substrate 18. Memory 16 is spaced immediately below laser array 12. Preferably, the substrate is made of a stable transmissive material such as common glass or any other stable material which is transmissive of the radiation generated by the array of lasers 12. In an alternative embodiment, the substrate may be reflective of the laser radiation rather than transmissive. This would merely require a different relative positioning of the lasers and detectors. The principles of the present invention would remain unchanged. Film 20, shown in FIG. 2, may be an exposed photographic emulsion or a metal coating, capable of occluding or otherwise blocking the passage of radiation emitted by the array of lasers 12 to the array of transducers 22. The film 20 is preferably absorptive under radiation, rather than reflective, so that it may be selectively removed by vaporization or fusion by the high intensity radiation generated in the lase mode by the lasers 17 in laser array 12.

Information is stored in the memory 16 by selectively forming holes in the film 20 using selected semiconductor lasers 17 in the array of semi-conductor lasers 12. The memory 16 stores bits of information in the form of "holes" or "no holes" in the film 20. Using a binary coded decimal system for each digit of a decimal number on the identification means, any four lasers 17 in the array 12 can write in the value of a digit, from 0 through 9, in binary form. Alternatively, consecutive pairs of digits of the decimal numbers may be encoded making it possible to save one bit, hence one laser, per pair of digits. In either case, a laser array of sufficient size can record an entire credit card number in coded form.

The size of the memory 16 depends upon the numbers of bits of information to be stored. However, since each hole formed by a particular laser 17 in the array 12 is only a few microns in diameter a large number of bits can be stored in a relatively small memory 16. In

BEST AVAILABLE COPY the embodiment illustrated herein, the memory is a disc. However, it may also be a tape formed in an endless loop.

The presence or absence of a hole is determined by radiation responsive transducers 24. Transducers 24 are aligned with the optical axes of the radiation emitted by corresponding lasers 17. In the illustrated embodiment, the array of transducers 22 is spaced immediately below memory 16. Preferably, for each transducer 24 in the transducer array 22 there corresponds 12 lasers 17 in the laser array 12. If radiation emitted from laser 17 passes through the memory 16, it will be detected by a particular transducer 24. On the other hand, when the radiation emitted from laser 17 is occluded or completely blocked from reaching transducer 24 by the film 20 on the memory 16, that event will also be detected by the appropriate transducer 24.

The memory 18 is shown as a disc, positioned intermediate the optical axes extending from the lasers in array 12 to corresponding transducers 24 in the transducer array 22. As best shown in FIG. 2, the disc can be interchangeably positioned between the transducer array 22 and the laser array 12 by means of a latch mechanism 26 which clamps the disc against the drive shaft 28. Drive shaft 28 is driven by a motor means (not shown) through a gear box 30. The latch mechanism 26 consists of a ball 82 retained in the slide 34 which is biased downwardly by the spring 36. The ball 32 is biased into a detent 38 in the memory 16. The latch mechanism 26 is shown schematically since other forms of latch mechanisms to properly position the memory 18 can be used.

As illustrated, the memory 18, when driven by the shaft 28, rotates between the optical axes extending from the laser array 12 to the transducer array 22. Such relative movement in effect causes the laser array 12 and transducer array 22 to scan the memory 16.

Although, by way of example, a coding system has been described in terms of numerics it should be understood that the memory can be used in conjunction with other coding systems such as alpha-numerics.

Figure 4:
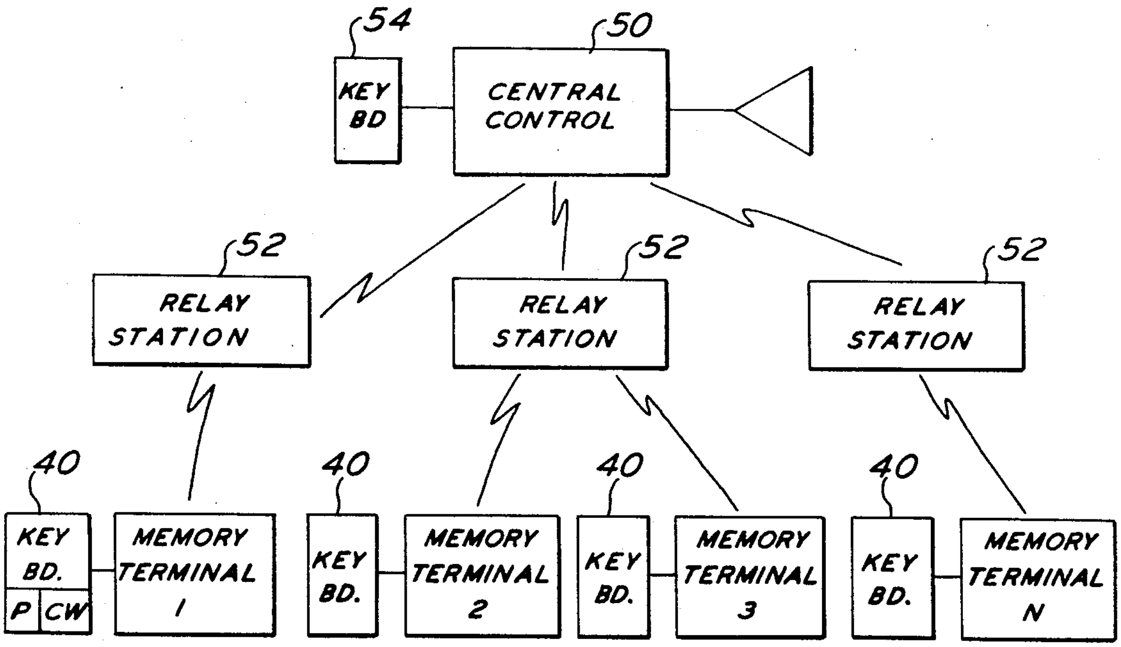
FIG. 4 is a block diagram of a system using a plurality of memories in accordance with the present invention.

As illustrated in FIG. 4, each terminal includes a keyboard 40 which may carry alpha-numeric indicia corresponding to the indicia that usually appears on identification means. The keyboard 40 may also have specialized keys for making certain inquiries of the memory 16. The keyboard 40 may have one key, among others, for operating the laser array in the light emitting mode used in reading. In addition, keyboard 40 may take any preferred form, such as the tone generating type presently used in telephone systems or even the rotary dial form. Finally, keyboard 40 may be located adjacent to memory 16. However, the keyboard 40 may be used at any location remote from memory 16. For example, keyboard 16 may be used at a credit card control office, retail store, restaurant, hotel, or any other establishment which extends credit on the basis of a credit card.

As previously indicated, the apparatus 10 makes use of a laser array 12. Each laser 17 in array 12 is capable of operation in two power modes, viz. a lase mode and a light emitting mode. In the lase mode the intensity of the radiation emitted is much greater than that in the light emitting mode. In accordance with the present invention, each of the lasers 17 in the array 12 is an electro-optic semi-conductor laser capable of generating radiation in the lase mode which radiation may be focused to a small spot on film 20 —in the order of several microns— of power density sufficient to vaporize, fuse or otherwise remove a portion of film 20. In addition, semi-conductor lasers 17 are capable of generating low intensity radiation in the light emitting mode. In that mode, the intensity of the radiation is sufficiently low that it will not affect the film 20. On the other hand, the intensity of the radiation is sufficiently great for the radiation to pass through substrate 18 and to actuate transducer 24 in the transducer array 22.

In the present invention, only one laser is used to both read and write information. In contrast, other systems, such as the system described in co-pending application Ser. No. 870,186, require two sources of radiation—one of which must be a laser—to both write and read. This is significant because the tolerances of one read-write device have no effect from function to function, tolerances being defined relatively rather than absolutely.

Another advantage of using semi-conductor lasers is that they can be manufactured in arrays of semi-conductor junctions. Thus, a large PN junction can be manufactured and then sliced to define a plurality of semi-conductor lasers in an array. For example, an array of 80 semi-conductor lasers can be made for the purpose of writing information in 20 columns. Each column would consist of four lasers and would be capable of recording any number from 0 through 9 in binary coded decimal form. Using such a system, it would be possible to record up to 3,000 accounts per inch on the surface of memory 16 because a pulse length of about $10^{-8}$ seconds to $10^{-6}$ seconds will produce a hole in film 20 within the range of 1–100 microns. It is a straightforward exercise in engineering and logic design to produce circuitry that will initiate the requisite combination of lasers 17 in the array 12 to form holes in the film 20 at the proper memory position.

As previously indicated, a semi-conductor PN junction laser can be operated in a light emitting mode. The radiation generated in that mode can be focused in an area which is roughly 3 microns by 1 mil in size. This is about twice the area in which the radiation generated in the lase mode can be focused. By properly spacing the lasers 17 the radiation generated in the light emitting mode can be used to read out information from memory 16 without error. Thus, the memory disc 16 is scanned by laser array 12 and transducer array 22. The appropriate lasers 17 representing the data to be correlated with the information stored in the memory are turned on in the light emitting mode. The transducers 24 will be activated according to the pattern of the holes on film 20 indicating correlation of the data with the information stored in the memory 16. The process of qualification may also be accomplished by turning on all of the lasers 17 while selectively blanking those transducers 24 which do not correspond to the given data.

Figure 3:
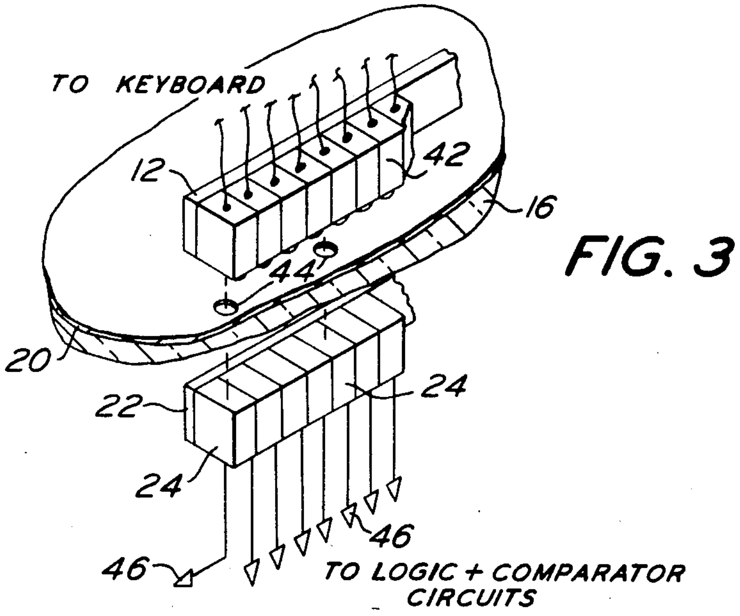
FIG. 3 is a perspective view illustrating how to use the invention.

In FIG. 3 each of the individual lasers 42 in the array 12 is operating in the light emitting mode. Holes 44 have already been formed in film 20. Only radiation emitted from two of the lasers 42 passes through holes 44. The radiation emitted by lasers 42 is detected by only two of the transducers 24, even though all of the transducers in the array 22 have been energized. The signals thus detected are amplified by amplifiers 46 and transmitted to the appropriate logic and comparator circuitry.

BEST AVAILABLE COPY

The two holes 44 represent a decimal digit. It is therefore possible to scan the memory 16 without the necessity for an addressing technique or, arguably, with only a simple addressing technique. Moreover, numbers from different credit card issuing firms can be mixed. For example, a 20 column scheme would allow for identification of the particular firm by a unique code in one of the columns.

From the foregoing, it should be apparent that the choice of a semi-conductor laser array is a significant advance from the prior art. The array is small in size; it is inexpensive to manufacture; it may be mass produced by the array technique; it emits radiation in the lase mode of sufficient intensity to remove selected portions of a film; it emits radiation in the light emitting mode of sufficient intensity to pass through a substrate and to be detected by a transducer; and it can be manufactured as a single unit. A further advantage is that the system operates with existing credit cards, despite variations from card issuing firm to card issuing firm. Moreover, the system can check each digit of a credit card number as that digit is entered. This process can continue until a particular digit of that number is not found in the memory file. This immediately indicates that the credit card is verified since only the numbers of bad credit cards are recorded. By way of example, the system may correlate the first three digits of the credit card number to the digits of a number stored in the memory. But if the fourth digit of the card number does not correlate with the fourth digit of a number in the memory, it is no longer necessary to enter any further digits. This reduces the probability of error in correlating the data with the information in the memory since an entire card number need not be entered. Thus, this feature reduces the time of the average search. This is significant in sales credit control applications, especially in light of the fact that only one percent of credit cards issued are derogatory.

From the foregoing, it should be apparent that there has been described a method and apparatus for qualifying identification means. The apparatus is controlled by two actions: (1) writing in the information on the memory film 20 by use of the lase mode of the semiconductor laser 17; and (2) reading out the information in the memory 16 by detecting the presence or absence of a combination of holes in the film 20. Additionally, the results of the process of qualification can be entered into the memory 16 at any time. The issuer of credit can determine the status of the credit card on an instantaneous real time basis. Thus, the apparatus solves the problem of providing information as to the status of a particular card on a real time basis.

It should be understood that the present system can be operated using a memory film which is reflective rather than absorptive. In that case, the presence or absence of a hole can be determined by reflecting the radiation from the reflective film 20 to the transducer array 22. By removing selective portions of the reflective film 20 to expose a non-reflective substrate 18, the effect is to blank out the particular transducer 24. In general, this system would operate in the same manner as the system which uses an absorptive film 20 as previously described.

Referring now to FIG. 4, there is shown a block diagram of an overall system in which the present invention may be used. As shown, a central control 50 is interconnected with a number of memory terminals 1, 2, 3,...N by radio communication through relay stations 52. Other forms of communication such as telephone can be used. Central control 50 may be located at the offices of the credit card issuing firm. Control 50 includes a keyboard 54 and memory device, preferably including the concept of the present invention. Basically, the keyboard 54 associated with central control 50 includes the same keys as keyboard 40 plus additional keys for signalling particular memory terminals and for additional control information. The relay stations 52 are conventional devices for detecting and retransmitting long distance radio signals.

Each of the terminals 1, 2, 3,...N includes a keyboard 40 which controls only the local memory. Each memory terminal 1, 2, 3,...N is located in a credit issuing establishment such as a hotel, resort, retail store or the like, and is in direct communication with central control 50. Each time central control 50 wishes to disqualify a particular credit card, it dials in the number of that card through keyboard 54. Keyboard 54 is in contact not only with central control memory 50, but also with each of the memory terminals 1, 2, 3,...N located at the credit issuing establishment. Thus, keyboard 54 of central control 50 controls every one of the memory terminals. Every time a credit number is dialed in, every one of the memory terminals 1, 2, 3,...N records the information. Thereafter, each time a local keyboard 40 dials in that number, the result will be an indication that the card has been disqualified.

The advantage of using a radio for intercommunication between the remote terminals 1, 2, 3,...N and central control 50 is that it is possible to use a portion of a common carrier service channel for the relay.

It is not necessary to limit the storage of information on the discs simply to credit card numbers. Thus, several columns can be used for control purposes. As already stated, one of those columns can indicate the credit card issuing company. Another column can indicate that credit has been restored and that the existence of the number on the memory should be ignored. Still other columns can be action columns; that is, they can indicate what action is to be taken. For example, one column can indicate that the credit is to be limited; and another that the card has been stolen; and still another that credit is to be issued only to a particular person in that family.

Although the present invention may operate with transducers 24 equal in number to the lasers 42, it should be understood that such equality is not required. For example, when operating a with a reflective substrate 18, a single transducer 24 could be used by reflecting all radiation toward it. The result would be a series of electronic pulses at the output of the transducer 24 as the memory 16 is scanned. By manipulation of these pulses according to conventional methods, these pulses will serve to identify a credit card number.

The present invention may be embodied in other specific forms without departing from the spirit or essential attributes thereof and, accordingly, reference should be made to the appended claims, rather than to the foregoing specification as indicating the scope of the invention.

I claim:

1. Data storage and qualification apparatus, comprising laser means for generating both coherent radiation and continuous wave radiation, said laser means comprising an array of lasers for generating a plurality of

BEST AVAILABLE COPY selected sources of radiation, each laser being capable of selectively generating pulsed coherent radiation or continuous wave radiation having a lower power value, a memory, said memory including a substrate and an occluding layer of material on said substrate for occluding the radiation generated by said array of lasers, an array of transducers responsive to the continuous wave radiation generated by said array of lasers, said transducers being positioned to detect continuous wave radiation incident on the surface of the substrate of the memory, said memory being intermediately positioned on an optical axis extending from said array of lasers to said array of transducers, means for focusing said coherent radiation on said occluding layer whereby portions of said layer are removed when said lasers are operated in a pulsed, coherent mode, removed portions of said layer defining stored information, means for scanning said memory relative to the array of lasers and transducers, and means responsive to the output of said transducers to read the stored information in said memory.

2. Data storage and qualification means in accordance with claim 1 wherein said array of lasers are semi-conductor lasers.

3. A method of qualifying information comprising the steps of storing the information on a memory having a substrate and removable layer on said substrate which occludes radiation emitted by a laser, using an array of lasers to both read and write on said memory, using said lasers to generate pulsed coherent radiation to write on said memory by removing portions of said layer, using the same lasers to generate continuous wave radiation to read what was written in said memory, and transducing the continuous radiation into electronic signals for reading what is written in the memory.

4. Data storage and qualification apparatus, comprising laser means for generating coherent radiation, said laser means comprising an array of lasers for generating a plurality of selected sources of radiation, each laser being capable of selectively generating pulsed coherent radiation or continuous wave radiation having a lower power value, a memory, said memory including a substrate and an occluding layer of material on said substrate for occluding the radiation generated by said laser means, transducer means responsive to the continuous wave radiation generated by said array of lasers, said transducer means being positioned to detect continuous wave radiation incident on the surface of the substrate of the memory, said memory being intermediately positioned on an optical axis from said array of lasers to said transducer means, means for focusing said coherent radiation on said occluding layer whereby portions of said layer are removed when said lasers are operated in a pulsed mode, removed portions of said layer defining stored information, and means for scanning said memory relative to the array of lasers and said transducer means.

5. Data storage and qualification apparatus, comprising laser means for generating both coherent radiation and continuous wave radiation having a lower power value, said laser means comprising an array of semi-conductor lasers for generating a plurality of selected sources of radiation, each semi-conductor laser being capable of selectively generating pulsed coherent radiation when operated in the lase mode or continuous wave radiation having a lower power value when operated in the light-emitting mode, a memory, said memory including a substrate and an occluding layer of material on said substrate for occluding the radiation generated by said array of semi-conductor lasers, an array of transducers responsive to the continuous wave radiation generated by said array of semi-conductor lasers, said transducers being positioned to detect continuous wave radiation incident on the surface of the substrate of the memory, said memory being intermediately positioned on an optical axis extending from said array of semi-conductor lasers to said array of transducers, means for focusing said coherent radiation on said occluding layer whereby portions of said layer are removed when said semi-conductor lasers are operated in the lase mode, removed portions of said layer defining stored information, and means for scanning said memory relative to the array of lasers and transducers.

6. Data storage and qualification means in accordance with claim 5 including means responsive to the output of said transducers to read the stored information in said memory.

7. Data storage and qualification means in accordance with claim 5 wherein said semi-conductor lasers are gallium arsenide lasers.

8. A method of qualifying information comprising the steps of storing the information on a memory having a substrate and a removable layer on said substrate which occludes continuous wave radiation emitted by a semi-conductor laser in the light emitting mode, using an array of semi-conductor lasers to both read and write on said memory, using said semi-conductors to generate pulsed coherent radiation in the lase mode to write on said memory by removing portions of said layer, using the same semi-conductor lasers to generate continuous wave radiation in the light emitting mode to read what was written in said memory, and transducing the continuous wave radiation into electronic signals for reading what was written in the memory.

9. Data storage and qualification apparatus, comprising laser means for generating both coherent radiation and continuous wave radiation of a lower power value, said laser means comprising an array of semi-conductor lasers for generating a plurality of selected sources of radiation, each semi-conductor laser being capable of selectively generating pulsed coherent radiation or continuous wave radiation having a lower power value, a memory, said memory including a substrate and an occluding layer of material on said substrate for occluding the continuous wave radiation generated by said laser means, transducer means responsive to the continuous wave radiation generated by said array of semi-conductor lasers, said transducer means being positioned to detect continuous wave radiation incident on the surface of the substrate of the memory, said memory being intermediately positioned on an optical axis from said array of semi-conductor lasers to said transducer means, means for focusing said coherent radiation on said occluding layer whereby portions of said layer are removed when said semi-conductor lasers are operated in the lase mode, removed portions of said layer defining stored information, and means for scanning said memory relative to the array of semi-conductor lasers and said transducer means.

10. Data storage and qualification apparatus in accordance with claim 9 wherein said semi-conductor lasers in said array of lasers are gallium arsenide lasers.

11. Data storage and qualification apparatus in accordance with claim 9 including means responsive to the output of said transducers to read the stored information in said memory.

* * * * *